June 15, 1926.

C. B. SPALSBURY

LASTING MACHINE

Filed Sept. 13, 1923

Inventor
Charles B. Spalsbury
by James R. Hodder
Attorney

June 15, 1926.
C. B. SPALSBURY
1,588,916
LASTING MACHINE
Filed Sept. 13, 1923   5 Sheets-Sheet 3
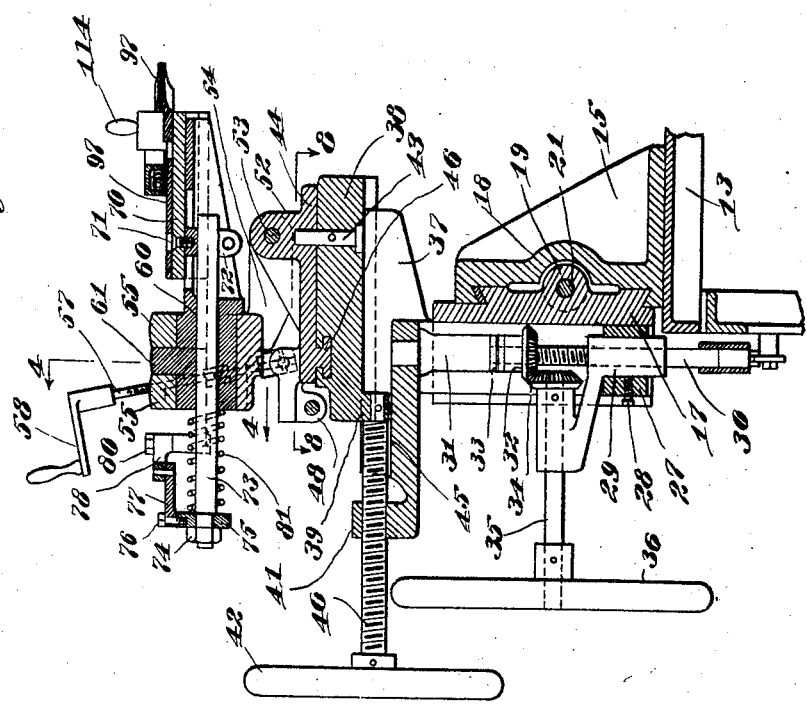
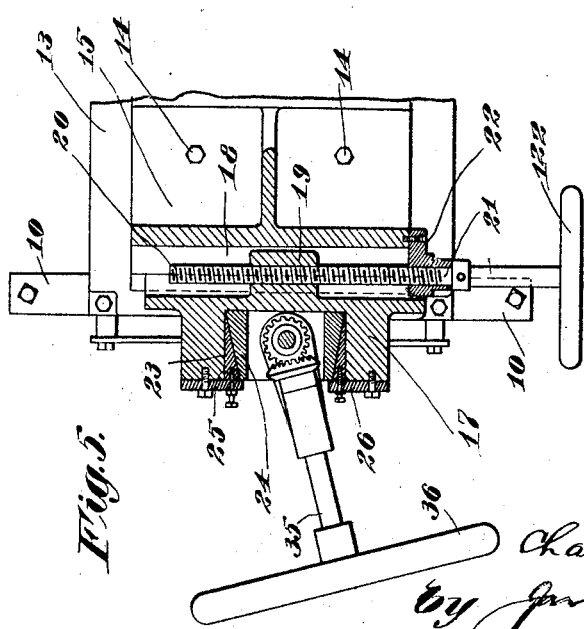
Inventor
Charles B. Spalsbury
By James R. Hodder
Attorney June 15, 1926.
C. B. SPALSBURY
LASTING MACHINE
Filed Sept. 13, 1923  5 Sheets-Sheet 4
1,588,916
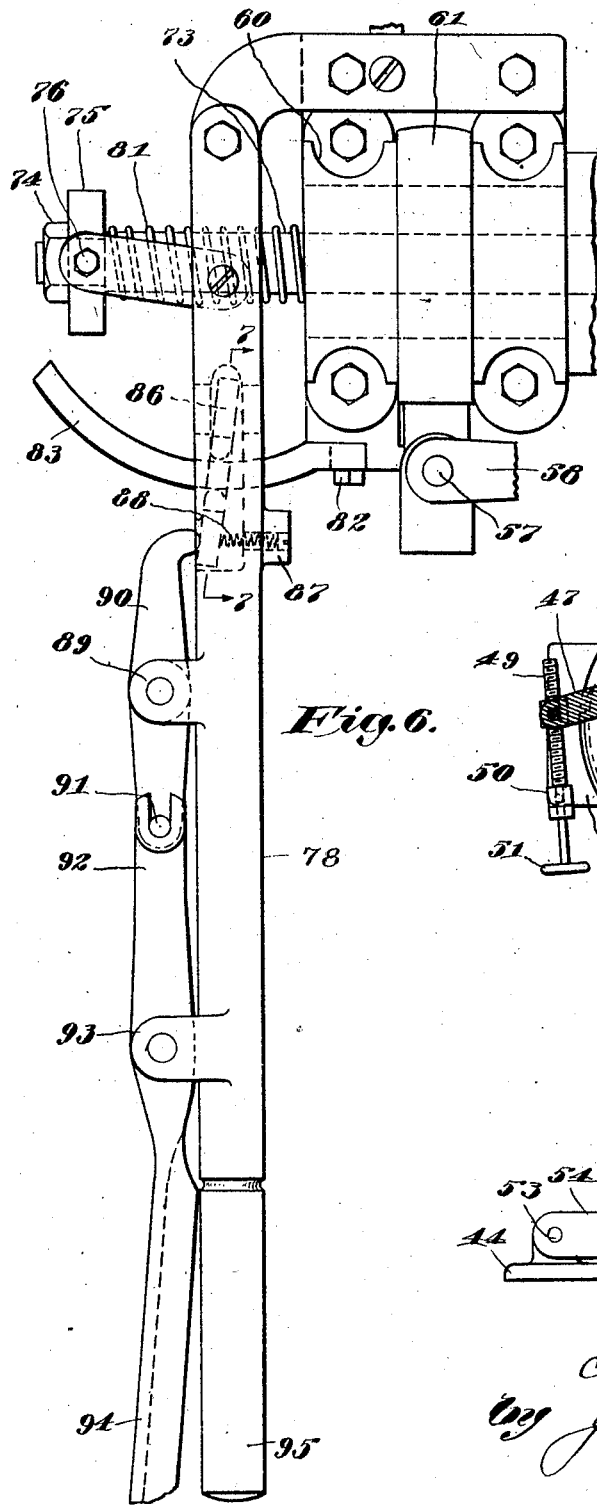
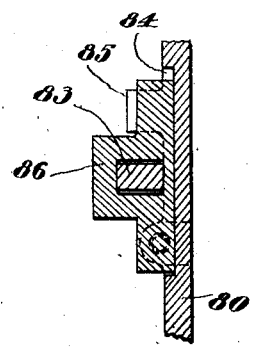
Fig. 7.
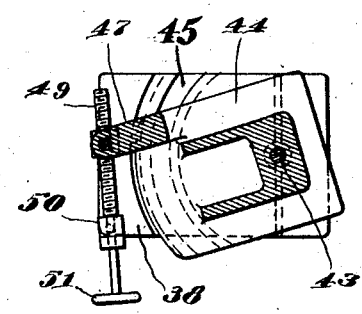
Fig. 8.
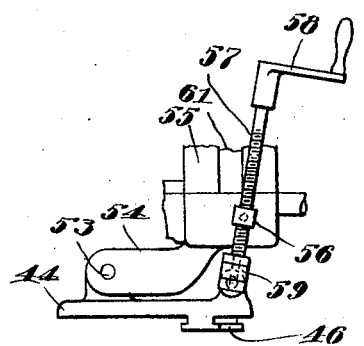
Fig. 9.
Inventor
Charles B. Spalsbury
by James R. Hodder
Attorney

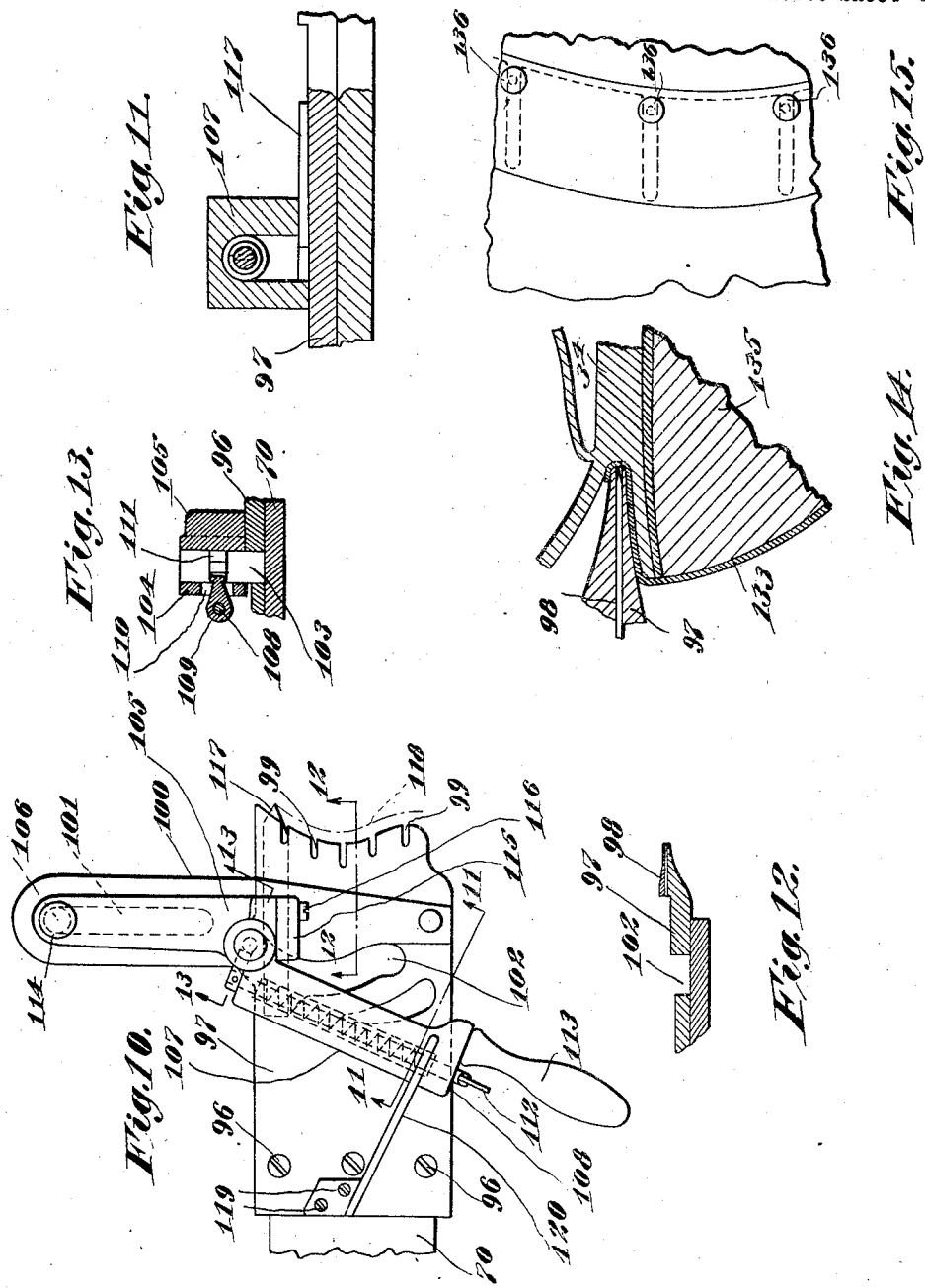

Patented June 15, 1926.

1,588,916

UNITED STATES PATENT OFFICE.

CHARLES B. SPALSBURY, OF ST. LOUIS, MISSOURI, ASSIGNOR TO JOHNSON, STEPHENS & SHINKLE SHOE COMPANY, OF ST. LOUIS, MISSOURI, A CORPORATION OF MISSOURI.

LASTING MACHINE.

Application filed September 13, 1923. Serial No. 662,578.

My present invention relates to lasting machines, and more particularly to an improved combined lasting and upper trimming machine.

In my prior copending applications, Serial No. 555,588, filed April 19, 1922, and Serial No. 566,496, filed June 7, 1922, I have described an improved novel type of shoe utilizing a combined or unitary inner and outsole, and in my copending application, Serial No. 630,031, filed April 5, 1922, I have described and claimed broadly a side lasting machine for carrying out the operation of lasting and fitting upper materials into a slot, groove, or recess formed in a single or laminated sole and for trimming the excess upper material during the lasting operation and before the lasting tools are removed from the lasting position. My present invention relates to a complete side lasting machine whereby the novel type of shoe described and claimed in my copending applications, Serial Nos. 555,588 and 566,496 may readily and economically be carried out and is also considered as an improvement over the side lasting machine described and claimed in my copending application, Serial No. 630,031 with particular reference to an improved form of upper trimming device.

In my present invention I have designed a side lasting machine in which the side lasting fingers are mounted for practically universal movement with respect to each other and to the shoe being worked upon and have combined with such side lasting fingers an improved form of upper trimming device comprising essentially a two-edged knife movable in a line substantially parallel to the fore and aft longitudinal axis of a shoe, such knife, however, being constrained to move in a line that follows the contour of the bottom of the slot, groove, or recess in the single or laminated sole, this said knife being mounted for accurate reciprocation and also mounted to be readily brought into and out of action with respect to both the side lasting fingers and the shoe being worked upon.

In designing my present machine I have so mounted the side lasting fingers as to allow them to be moved vertically upward or downward, rotated throughout a vertical axis, moved longitudinally or laterally in horizontal and vertical planes, and practically, therefore, such side lasting fingers are universally mounted. Also, I have provided means for rapid and accurate reciprocation of said side lasting fingers toward and from the shoe being worked upon with means to automatically lock said fingers in any position in which they may be placed.

Further features and novel construction and arrangement of parts will appear as the description of the invention progresses.

In the accompanying drawings illustrating the preferred embodiment of my invention:—

Fig. 3 is a vertical longitudinal section of one side of the machine, the section being taken so as to include the means for elevating and reciprocating the side lasting fingers;

Fig. 4 is a detail section on the line 4—4 of Fig. 3;

Fig. 5 is a horizontal section on the line 5—5 of Fig. 1;

Fig. 6 is an enlarged detail showing the reciprocating means for the side lasting finger holding head;

Fig. 7 is a detail section on the line 7—7 of Fig. 6;

Fig. 8 is a horizontal section on the line 8—8 of Fig. 3;

Fig. 9 is a detail of a portion of Fig. 3;

Fig. 10 is an enlarged detail showing the cutter operating means;

Fig. 11 is a sectional detail on the line 11—11 of Fig. 10;

Fig. 12 is a detail section on the line 12—12 of Fig. 10;

Fig. 13 is a detail section on the line 13—13 of Fig. 10;

Fig. 14 is a detail section of a portion of a shoe showing the side lasting fingers in position and holding an upper in lasted position on the insole and with the trimming cutter in position to trim off surplus material, and Fig. 15 is a plan view of Fig. 14.

Figure 1:
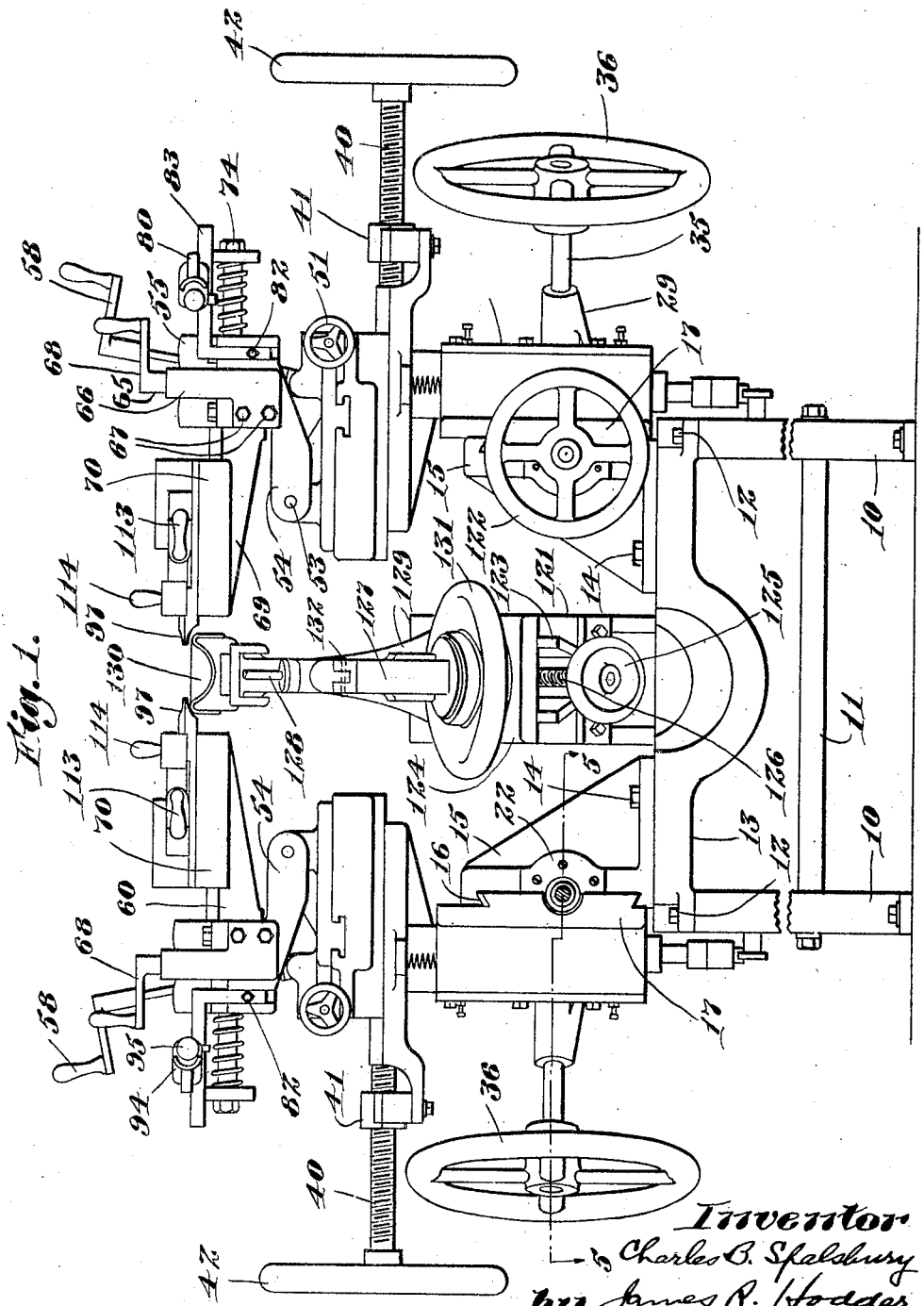
Fig. 1 is a front elevation.
Figure 2:
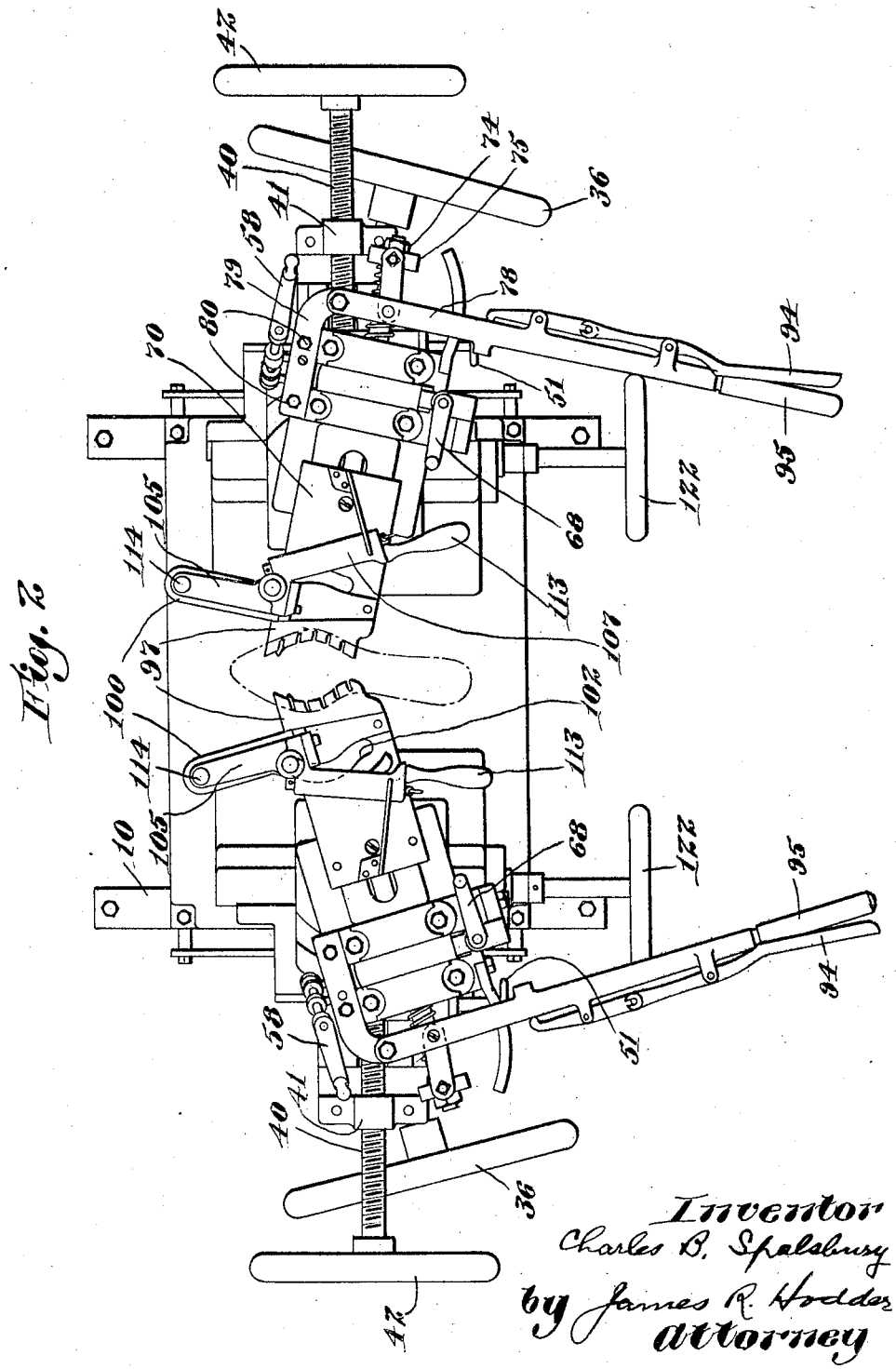
Fig. 2 is a plan view.

Referring to the drawings, 10 designates side members held together and spaced apart by bars 11, and secured to the top of the side members 10 by bolts 12 is a top plate 13.

Arranged on either side of the top plate 13 are collections of mechanism which, as they are practically exact duplicates of each other, need not be separately described. In the accompanying description, therefore, but one such set of mechanisms is referred to, it being understood that the description of one set of mechanism applies equally well to the other set of mechanisms and such differences as exist between the two sets of mechanisms will be specifically referred to and described.

Secured to the top plate 13 by bolts 14 is an angle plate 15 in the vertical face of which is provided guideways 16 in which is mounted for sliding movement in a horizontal plane a vertically arranged member 17. The angle member 15 is provided with a groove 18 to provide a channel in which slides a member 19 formed integral with the member 17 and this member 19 is internally threaded to receive the external threads 20 of a shaft 21, and associated with the shaft 21 is a plate 22, which plate is secured to the angle member 15 so as to allow rotative movement of the shaft 21 with respect thereto, but which plate prevents longitudinal movement of such shaft. Secured to the protruding end of the shaft 21 is a hand wheel 122 and by means of which the shaft 21 may be rotated to cause a reciprocation of the member 17 in the guideways 16.

The outer face of the member 17 is provided with a vertical groove or recess 23 in which is mounted, for vertical sliding movement, a member 24, gibs 25 and plates 26 being provided to retain such member 24 in vertical sliding position in the member 17. To the member 17 at the lower end of the vertical slot or groove 23 is secured a lock 27 in which is secured by setscrew 28 a bearing bracket or arm 29 in which is mounted for vertical sliding movement the threaded shaft 30, the upper end of this shaft 30 being rotatably mounted in a bearing block lock 31 secured to the upper end of the member 24. Threaded on the shaft 30 is a bevel pinion 32, an anti-friction bearing 33 being placed between such bevel pinion 32 and the lower end of the member 31. This bevel pinion 32 meshes with, and is driven by, a bevel pinion 34 secured to the inner end of a horizontally mounted shaft 35, this shaft being mounted in the bearing bracket 29, and secured to the outer end of the shaft 35 is a hand wheel 36 by means of which the said shaft 35 may be rotated.

Formed integral with the member 24 and at the upper end thereof is an enlargement 37, the upper surface of which lies in a horizontal plane and formed in such upper surface is a guideway in which is slidably mounted a member 38, this member 38 being provided at one end with a depending lug 39 to which is secured for rotary movement with respect thereto a threaded shaft 40, which shaft threads through an internally threaded boss 41 formed integral with the member 37. Secured to the outer end of the threaded shaft 40 is a hand wheel 42 and by means of which the shaft 40 may be rotated to impart reciprocatory movement to the member 38 in a horizontal plane.

Secured to the member 38 and extending upwardly therefrom is a pin or shaft 43 on which is mounted for rotative movement a member 44. Formed in the upper surface of the member 38 and about the center of the shaft or pin 43 as an axis is a guideway 45 in which is mounted for slidable movement a curved member 46 formed integral with, and on the lower face of, the member 44. One side or end of the member 44 is extended to form an arm 47 in which is rotatably mounted a threaded nut 48 in which nut screws a threaded shaft 49 that is rotatably mounted in, and immovable longitudinally of, a member 50 rotatably mounted in the upper surface of the member 38, as clearly shown in Fig. 8. The threaded shaft 49 extends outwardly beyond the member 50 and is provided with a hand wheel 51 by means of which the shaft 49 may be rotated to cause rotative movement of the member 44 about the vertical shaft or pin 43. Formed on the upper face of the member 44 adjacent to, and at each side of, the vertical shaft or pin 43 is a lug or ear 52 in which is mounted, on shaft 53 for rotary movement in a vertical plane, a member 54. Formed integral with the member 54 and extending upwardly therefrom on the end remote from the shaft 53 is a bearing member 55 to one side of which is rotatably mounted a threaded nut 56 through which is threaded a shaft 57 provided on its upper end with an operating handle 58. The lower end of the threaded shaft 57 is rotatably mounted in a member 59 that is rotatably mounted on the member 44 for movement in a vertical plane. Rotation of the shaft 57, therefore, rotates the member 54 and all parts formed integral therewith or carried thereby about the shaft 53 as a center.

Rotatably mounted in the bearing members 55 is a hollow member 60 provided with a member 61 that is enclosed by the member 55 and this member 61 is provided with a portion 62 that fits within, and is engaged by, the sides of a slot 63 formed in a member 64, which member is internally threaded to receive the threaded portion of a vertically mounted shaft 65 mounted in a bracket 66 secured to the member 55 by bolts 67. This shaft 65 is provided on its upper end with an operating handle 68 and by means of which the shaft 65 may be rotated and, referring to Fig. 4, it will be obvious that rotation of the shaft 65 in either direction will cause a rotary motion of the hollow member 60 in the bearing member 55. The hollow member 60 has formed integral therewith a member 69 that extends outwardly therefrom and constitutes a guideway on which is mounted for reciprocating movement thereon a head 70. Secured to the under face of the reciprocating member 70 by screw 71 is a lug 72 to which is fastened one end of a shaft 73, which shaft extends rearwardly through the hollow member 60 and has secured to its extreme rear end by nut 74 a member 75. Pivotally mounted on the upper face of the member 75 by bolt 76 is a link 77, the other end of which is pivotally mounted on a lever 78, this lever being pivotally mounted at its end to an arm 79 secured to the member 60 by bolts 80. On the shaft 73 and located between the member 75 and one end of the hollow member 60 is a compression spring 81 which tends, as illustrated in Fig. 3, to move the reciprocating plate 70 to the rear or to the left, as viewed in said figure. Secured to the side of the hollow member 60 by bolt 82 is an arcuate member 83 which is normally in engagement with the under face of the lever 78. The under face of the lever 78 is recessed at 84 and is provided with a lug 85 adjacent such recess in which fits one end of a slotted member 86 which surrounds the arcuate member 83, as clearly shown in Fig. 7. On one side of the lever 78 is a boss 87 drilled to receive a compressing spring 88 that bears against the end of the member 86 remote from the lug 85, such spring 88 tending to force the end of the member 86 about the lug 85 as a pivot and thus cause the sides of the slotted member 86 to engage with the arcuate member 83 and lock the lever 78 in position with respect to such arcuate member. On the side of the lever 78 opposite the boss 87 is a lug or ear 89 in which is pivotally mounted a lever 90, one end of which engages the end of the slotted member 86 while the other end is provided with a pivot pin 91 that engages in a slot at the end of a lever 92 that is pivotally mounted intermediate its ends in the lug or ear 93 formed integral with the lever 78. The end of the lever 92 remote from the pivot 91 is formed in the shape of a handle 94 and lies adjacent the handle end 95 of the lever 78. It will be obvious that the operator, by grasping the handle portions 94 and 95 and moving the same toward each other, will cause an inward movement of the end of the lever 78 in engagement with the slotted member 86 and force such end against the compression spring 81, thus bringing the slot in such member 86 in position to allow free movement of the same, and therefore the lever 78, with respect to the arcuate member 83. When the slotted member 86 is in the position last described, the compression spring 86 acts to prevent the operator from forcing the head too hard forward thereby functioning as a cushion.

Secured to the top of the reciprocating member 70 by screws 96 is a plate 97, the forward or working edge of which is provided with a slot 98 lying in a horizontal plane and extending entirely across the width of the plate 97, this front end also having a contour substantially identical with the contour of the sole of a shoe and also being provided with a plurality of spaced grooves or indentations 99 and through which tacks may be driven to hold the shoe elements in position until after the sewing operation has been performed thereon. To the upper face of the plate 97 and to the rear of the working edge thereof is secured a plate 100 provided with a slot or groove 101 extending at right angles to the length of the plate 97. Formed in the plate 97 is an cam guide 102, the contour of which is substantially that of the contour of the working edge of the plate. Adapted to engage with the cam guide 102 is a pin 103 that is mounted for vertical movement in a boss 104 formed on the upper surface of a member 105. This member 105 has secured to its lower face at one end thereof a downwardly extending pin 106 mounted for sliding movement in the slot 101 referred to as being formed in the member 100. On the opposite side of the boss 104 from the pin 106 and formed integral with the member 105 is a tubular member 107 in which is rotatably mounted a shaft 108. To the end of the shaft 108 adjacent the boss 104 is secured a lug 109 which extends through a slot 110 in the boss 104 and engages in a circumferential groove 111 formed in the pin 103. To the other end of the shaft 108 is secured an upwardly extending operating finger 112 that lies adjacent the handle 113 secured to the tubular member 107. The pin 106 is formed on the lower end of a handle 114 that extends upwardly from the member 105. In operation, and assuming the pin 103 to be engaged in the cam guide 102, the operator, by grasping the handles 113 and 114, is able to move the members 105 and 107 transversely with respect to the member 97, the pin 103 causing the device to move in the path defined by the curved cam guide 102. Secured to the member 105 by means of the plate 115 and the screw 116 is a double edged knife 117, the cutting point of which extends through the slot 98 in the inward or forward portion of the plate 97 and the path of the cutting point of this knife is indicated in dot and dash lines designated 118 in Fig. 10. The distance the cutting point of the knife 117 extends beyond the curved inner or working edge of the plate 97 may be varied by means of the clamping means 115 and 116. Secured to the rear portion of the plate 97 by screws 119 is a member 120 which acts as a bearing for the top surface of the member 107. By sliding the members 105 and 107 upward, as viewed in Fig. 10, or transversely of the plate 97, the operating finger 112 may be utilized to rotate the shaft 108 to cause the member 109 to move the pin 103 out of the cam guide 102 which allows the hollow member 107 to be swung about the pin 106 as a pivot in order to move the cutting point of the knife 117 rearwardly of the operating edge of the plate 97 a sufficient distance to prevent engagement by said cutting edge with any tacks or other fastenings that may have been inserted into the shoe structure through the slots 99.

As stated above, the mechanism so far described mounted on the top or platform 13 is made in duplicate, one on either side of the said platform and with the operating edges of the plates 97 spaced apart from, and opposed to, each other. Mounted on the top of the platform 13 and centrally arranged with respect thereto and with respect to the duplicate mechanism above referred to, is mounted a jackstand of the usual and well known form employed in lasting machine and comprises essentially a base 121 on which is formed guides 123 on which is slidably mounted a member 124, the usual hand wheel 125 being employed in connection with the screw 126 for effecting the reciprocatory motion of the member 124. Formed integral with, and extending upward from, the member 124 is the jack upright 127 at the top of which is mounted the pin 128 that fits into the thimble of the last on which the shoe structure is to be built up. Extending upwardly from the rear portion of the member 124 is the upright 129 provided at its upper end with a pad or anvil 130 on which rests the toe of the last. Surrounding the lower portion of the upright 127 adjacent the member 124 is the usual hand wheel 131 which, through the usual mechanism, (not shown) tilts the upper portion of the member 127 about the pivot point 132, the mechanism for tilting and the connection of such mechanism with the hand wheel 131 not being shown.

The shoe structure comprising the upper 133, the unitary or laminated combined insole and outsole 134, is placed in position on the last 135 preparatory to lasting the shoe by the machine forming the subject matter of the present invention and, assuming that the shoe structure not lasted is placed in position with the thimble of the last 135 fitting onto the pin 128 and the hand wheel 131 utilized to clamp the last on the pad or anvil 130, the method of operation of my improved machine is as follows, it being understood that, as in the above description, operation of one of the duplicate mechanisms applies with equal force to the other of such mechanisms. The hand wheel 36 is rotated to move the member 37 and all parts carried thereby upwardly to bring the working edge of the member 97 to the approximate vertical position with respect to the shoe being worked on, and then the hand wheel 17 is operated to bring such mechanism, carried by the member 37, into the approximately correct vertical plane, after which the hand wheel 42 is employed to slide the mechanisms carried by the member 38 on the member 37 so as to bring the operating edge of the members 97 adjacent the shoe structure. To obtain a final adjustment of the plate 97 with respect to the shoe structure, the handle 68 may be utilized to rotate the member 97 about the hollow member 60 as an axis and the handle 58 operated to move the plate 97 about the axis 53 and it will be obvious that, by the proper manipulation of the various hand wheels and handles referred to, the operating edge of the plate 97 is universally adjustable with respect to the boot or shoe. To obtain the proper angle to allow for the contour of the sole of the shoe being worked on, the hand wheel 51 may be manipulated to rotate the mechanism carried by the member 44 about the axis 43, this completing the final adjustment of the working members. Assuming the shoe structure to have been built up in the manner referred to in my copending application above referred to, that is, to the extent of having the heel and toe portions of the upper tacked to the insole and with the intermediate portion of the upper free, the handle 95 is utilized to slide the plate 97 along the member 70 until the working edge thereof engages with the upper 133 when such upper is forced into the groove or slot in the composite insole and outsole, as clearly shown in Fig. 14. The handle 94 of the lever 92 is naturally grasped simultaneously with the grasping of the handle 97 of the lever 78 so that the release and locking mechanism 86 is automatically released, allowing free movement of the lever 80 on the arcuate member 83 and, when the plate 97 has moved the upper 133 into the proper position in the slot or groove separating the outsole portion from the insole portion of the composite outsole and insole 134, release of the member 94 will allow the spring 88 to throw the locking member 86 into locking position to hold the lever 80, and therefore the plate 97, in the position in which they have been placed. While the parts are in the position just described, the operator grasps the handles 113 and 114 and moves the hollow member 107 into such a position as to allow the pin 103 to drop into the guide 102, which properly positions the knife with respect to the shoe structure. Movement of the members 105 and 107 transversely of the plate 97 and in a path defined by the cam guide 102 will cause the cutting end of the knife 117 to engage with the upper 133 and cut off the surplus stock therefrom, which surplus stock may be pulled out by hand. To positively insure cutting off such surplus stock, a reciprocatory motion may be imparted to said knife by a repeated transverse movement guided by the guide 102 and, when the surplus stock has been cut off, the operator, by moving the handle 112, lifts the pin 103 out of the cam guide 102 to move the members 105 and 107 about the pin 106 as a center, causing the knife 117 to be moved rearwardly with respect to the operating edge of the plate 97 a sufficient distance to clear the slots 99. The outsole portion of the combined outsole and insole is then folded down over the plate 97 and, while in this position, holding tacks 136 are driven through the shoe structure and clinched on the bottom of the last 135 to hold the upper 133 in lasted position. After the driving of the tacks 136, the plates 97 are removed from engagement with the shoe structure and the above cycle of operations repeated on another shoe.

While I have necessarily shown and described the preferred embodiment of my invention somewhat in detail, it is to be understood that I may vary the size, shape, and arrangement of parts comprising my invention within wide limits without departing from the spirit of the invention.

Having thus described my invention, what I claim as new is:—

1. In an improved lasting machine, the combination of means for holding a shoe structure to be lasted, a plurality of side lasting devices, said lasting devices being located on either side of the shoe holding means, means for universally adjusting said side lasting means with respect to the shoe structure, and means associated with said side lasting means for trimming off excess leather from the shoe upper.

2. In an improved lasting machine, the combination of a reciprocatory movable lasting tool, a cam guide therein, a cutting tool, a holder therefor, and means carried by the holder and cooperating with the cam guide for guiding the cutting tool substantially transversely of the lasting tool.

In testimony whereof, I have signed my name to this specification.

CHAS. B. SPALSBURY.